US006185424B1

United States Patent
Pon et al.

(10) Patent No.: US 6,185,424 B1
(45) Date of Patent: *Feb. 6, 2001

(54) SYSTEM FOR TDMA MOBILE-TO-MOBILE VSELP CODEC BYPASS

(75) Inventors: Hermon Pon, McKinney, TX (US); Rafi Rabipour, Cote St. Luc; Chung-Cheung Chu, Brossard, both of (CA)

(73) Assignee: Nortel Networks Limited, Montreal (CA)

( * ) Notice: Under 35 U.S.C. 154(b), the term of this patent shall be extended for 0 days.

This patent is subject to a terminal disclaimer.

(21) Appl. No.: 09/096,192

(22) Filed: Jun. 12, 1998

(51) Int. Cl.[7] ................................................. H04Q 7/22
(52) U.S. Cl. ............................................. 455/445; 455/450
(58) Field of Search ................................. 455/445, 436, 455/550, 522

(56) References Cited

U.S. PATENT DOCUMENTS

| 5,297,147 | 3/1994 | Shimokasa | 370/118 |
|---|---|---|---|
| 5,499,240 | 3/1996 | Gittins et al. | 370/68.1 |
| 5,563,912 | 10/1996 | Yasunaga et al. | 375/242 |
| 5,608,779 | * 3/1997 | Lev et al. | 455/436 |
| 5,768,308 | * 6/1998 | Pon et al. | 455/550 |
| 5,953,666 | * 9/1999 | Lehtimaki | 455/550 |
| 5,956,673 | * 9/1999 | Weaver et al. | 455/436 |
| 5,987,327 | * 11/1999 | Lev, II et al. | 455/445 |

FOREIGN PATENT DOCUMENTS

| 0 490 509 | 6/1992 | (EP) . |
|---|---|---|
| 4216265 | 8/1992 | (JP) ............................... H04N/1/32 |
| 96/16521 | 5/1996 | (WO) . |

OTHER PUBLICATIONS

Yasuda et al., "Network Functions for the Application of Multi-rate Speech Coding in Digital Cellular Systems", Proceedings of IEEE Vehicular Tech. Conf., vol. 1, pp. 306–310, (1994).

Uebayashi et al., "Development of TDMA Cellular Base Station Equipment", Vehicular Tech. Society 42nd Conf., vol. 1, pp. 566–569, (1992).

* cited by examiner

Primary Examiner—Daniel S. Hunter
Assistant Examiner—Myron K. Wyche
(74) Attorney, Agent, or Firm—Dennis R. Haszko

(57) ABSTRACT

In a TDMA mobile-to-mobile connection, the end-to-end audio signal quality as well as system performance can be improved by providing digital signal processors the capability to automatically switch configuration such that each digital signal processor in a mobile-to-mobile communication connection can automatically identify a TDMA mobile-to-mobile connection and bypass the speech encoding and decoding processes within the digital signal processors. The two digital signal processors are virtually connected at the channel codecs.

34 Claims, 16 Drawing Sheets

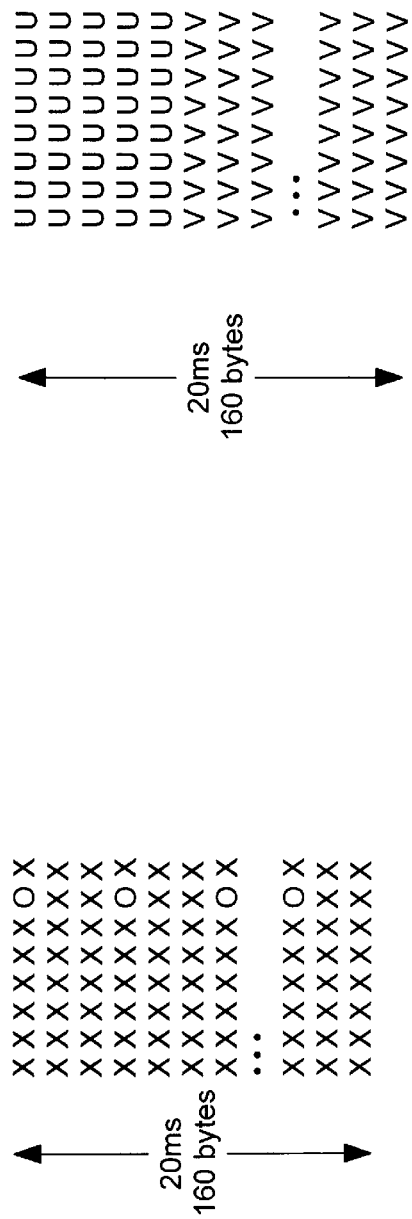
FIG. 3
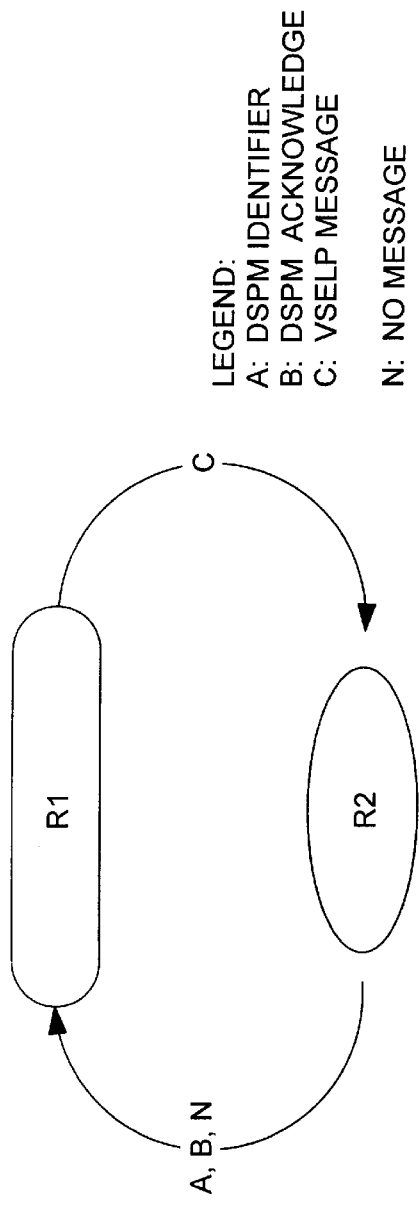
FIG. 4
FIG. 5
LEGEND:
A: DSPM IDENTIFIER
B: DSPM ACKNOWLEDGE
C: VSELP MESSAGE
N: NO MESSAGE LEGEND:
A: DSP IDENTIFIER
B: DSP ACKNOWLEDGE
C: VSELP MESSAGE
S: SPECIAL MESSAGE
N: NO MESSAGE

| TRANSMITTER STATE | OUTPUT FORMAT | MESSAGE TO TRANSMIT |
|---|---|---|
| T1 | PCM | "A": DSP IDENTIFIER |
| T2 | PCM | "B": DSP ACKNOWLEDGMENT |
| T3 | VSELP | "C": VSELP |
| T4 | VSELP | "C": VSELP |

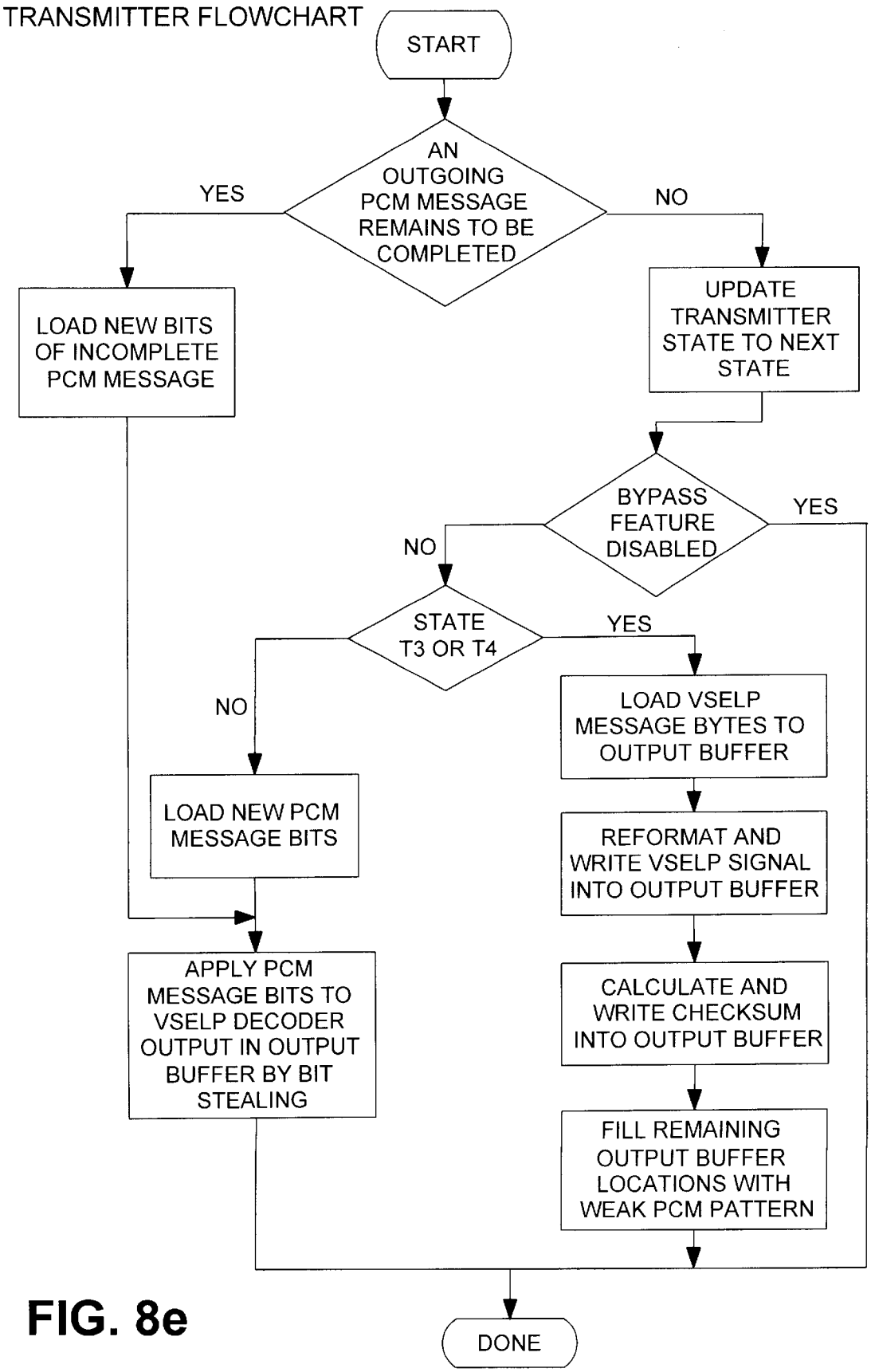

MESSAGE RECEIVER

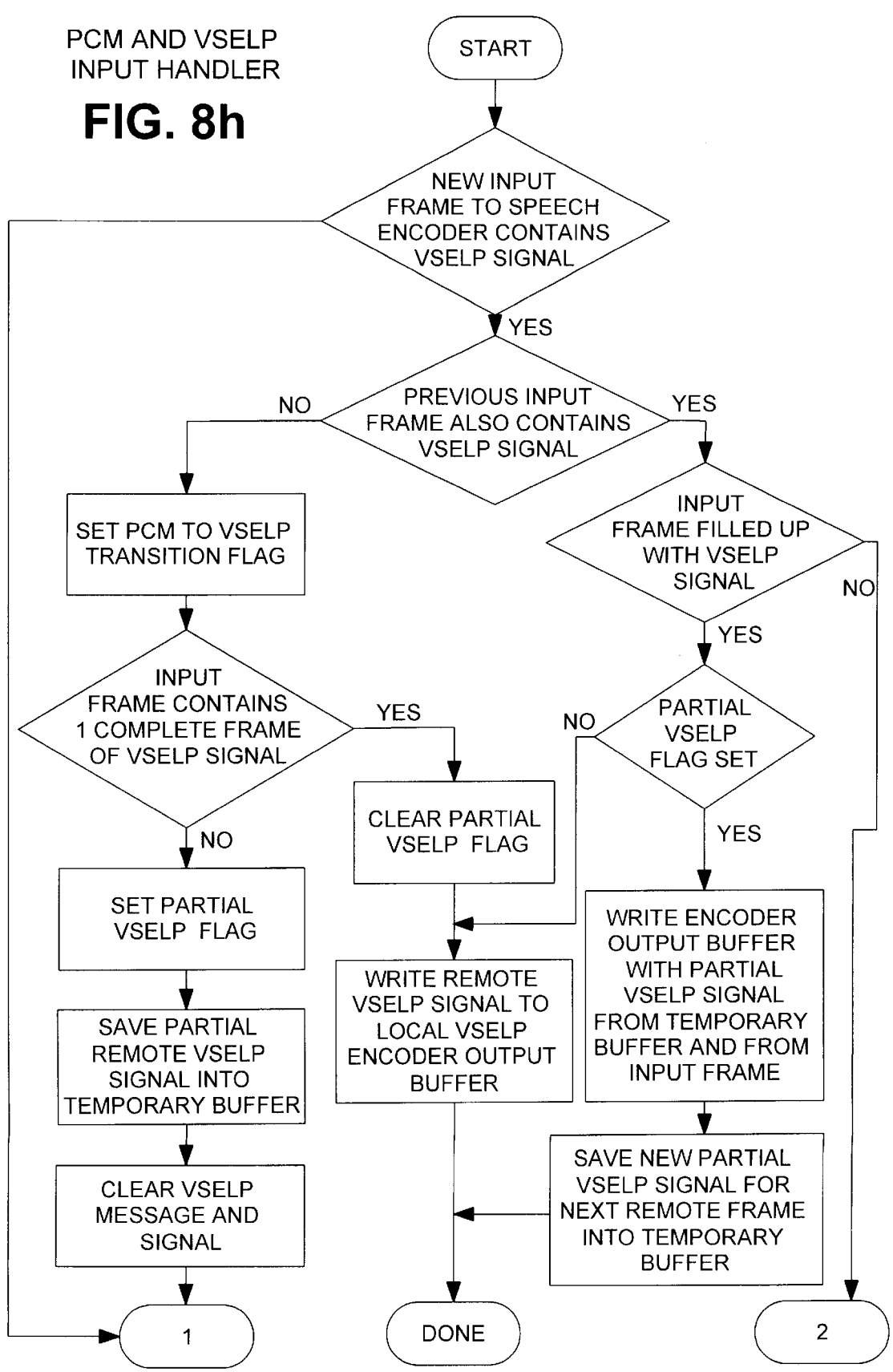
FIG. 8h  PCM AND VSELP INPUT HANDLER

FIG. 10

| VSELP PARAMETER | BITS | DEFINITIONS |
|---|---|---|
| STATE | 3 | CRC |
| LPC1 | 6 | 1ST REFLECTION COEFFICIENT |
| LPC2 | 5 | 2ND REFLECTION COEFFICIENT |
| LPC3 | 5 | 3RD REFLECTION COEFFICIENT |
| LPC4 | 4 | 4TH REFLECTION COEFFICIENT |
| LPC5 | 4 | 5TH REFLECTION COEFFICIENT |
| LPC6 | 3 | 6TH REFLECTION COEFFICIENT |
| LPC7 | 3 | 7TH REFLECTION COEFFICIENT |
| LPC8 | 3 | 8TH REFLECTION COEFFICIENT |
| LPC9 | 3 | 9TH REFLECTION COEFFICIENT |
| LPC10 | 2 | 10TH REFLECTION COEFFICIENT |
| RO | 5 | FRAME ENERGY |
| LAG1 | 7 | LAG FOR 1ST SUBFRAME |
| CODE1_1 | 7 | 1ST CODEBOOK CODE FOR 1ST SUBFRAME |
| CODE2_1 | 7 | 2ND CODEBOOK CODE FOR 1ST SUBFRAME |
| GSP0_1 | 8 | EXCITATION GAINS INDEX FOR 1ST SUBFRAME |
| LAG2 | 7 | LAG FOR 2ND SUBFRAME |
| CODE1_2 | 7 | 1ST CODEBOOK CODE FOR 2ND SUBFRAME |
| CODE2_2 | 7 | 2ND CODEBOOK CODE FOR 2ND SUBFRAME |
| GSP0_2 | 8 | EXCITATION GAINS INDEX FOR 2ND SUBFRAME |
| LAG3 | 7 | LAG FOR 3RD SUBFRAME |
| CODE1_3 | 7 | 1ST CODEBOOK CODE FOR 3RD SUBFRAME |
| CODE2_3 | 7 | 2ND CODEBOOK CODE FOR 3RD SUBFRAME |
| GSP0_3 | 8 | EXCITATION GAINS INDEX FOR 3RD SUBFRAME |
| LAG4 | 7 | LAG FOR 4TH SUBFRAME |
| CODE1_4 | 7 | 1ST CODEBOOK CODE FOR 4TH SUBFRAME |
| CODE2_4 | 7 | 2ND CODEBOOK CODE FOR 4TH SUBFRAME |
| GSP0_4 | 8 | EXCITATION GAINS INDEX FOR 4TH SUBFRAME |

SYSTEM FOR TDMA MOBILE-TO-MOBILE VSELP CODEC BYPASS

FIELD OF THE INVENTION

This invention relates to signal processing in a digital cellular system and more particularly, to a method of providing an automatic switching capability from a tandem to a single Vector Sum Excited Linear Prediction (VSELP) speech encoder/decoder configuration in a TDMA mobile-to-mobile connection.

BACKGROUND OF THE INVENTION

Digital signal processor (DSPs) are used in digital mobile cellular radio systems to enable echo cancellation, speech encoder/decoder (codec) functions and channel encoder/decoder functions for TDMA channels. These digital signal processors perform in some installations echo cancellation on the switch side of the cellular infrastructure. Some equipment manufacturers provide for these functions on the cell site end of the cellular system. In both cases, the speech and channel encoder/decoder (codec) designs and implementations are made to comply with Communications Technology Industry Association's (CTIA) Digital Cellular Interim Standard (IS-54) specification.

In a TDMA mobile-to-land connection, audio signals arriving at the digital signal processor from the land source is first subject to echo cancellation. The echo cancelled signal is then compressed into IS-54 VSELP signal format with a 8:1 ratio and the compressed signal is channel encoded and sent over the air to the mobile. VSELP signal arriving at the mobile is channel decoded and then used to reconstruct the original audio signal by the speech decoder. The entire speech encoding and decoding process introduces perceptible coding noise to the reconstructed speech signal. Audio signal travelling in the reverse direction (mobile to land) is subject to the same encoding and decoding processes but with no echo cancellation by the digital signal processors.

A TDMA mobile-to-mobile connection is realized basically by connecting two TDMA mobile-to-land calls back to back between two digital signal processors. Thus, an audio signal travelling in either direction is subject to two speech encoding and decoding processes operating in tandem. Thus, the coding noise introduced at each end degrades the quality of voice signal received by each subscriber.

Accordingly, a requirement exists to reduce the amount of coding noise which is generated during mobile-to-mobile communication.

SUMMARY OF THE INVENTION

With the design of the present invention, the digital signal processor is provided with the capability to automatically switch configuration such that two digital signal processors can automatically identify a TDMA mobile-to-mobile connection and bypass the speech encoding and decoding processes within the digital signal processors. The two digital signal processors are virtually connected at the channel codecs. Thus enhancing the end-to-end audio signal quality as well as improving system performance.

According to an aspect of the present invention, there is provided a digital cellular radio system for enabling digital mobile radios to communicate with each other and the public switched telephone network via radio cell sites and a mobile switching office, said digital cellular radio system having digital signal processor means for providing echo cancellation, speech encoding/decoding and channel encoding/decoding of audio signals, comprising:

a first digital signal processor for enabling echo cancellation, speech encoding/decoding and channel encoding/decoding of audio signals from a local digital mobile telephone;

a second digital signal processor for enabling echo cancellation, speech encoding/decoding and channel encoding/decoding of audio signals from a remote digital mobile telephone;

a message transmitter for transmitting in-band signalling information to a remote digital signal processor;

a message receiver for detecting in-band signalling information at a local digital signal processor; and a controller for monitoring the transmission of signalling information from a remote message transmitter to a local message receiver, wherein when the local message receiver detects inband signalling information from the remote message transmitter indicating that a digital mobile-to-mobile connection is established, the first and second digital signal processors can switch to a by-pass mode to by-pass the speech encoding/decoding and echo cancellation functions such that each digital mobile radio communicates audio signals directly with each other in a VSELP format via the channel encoding/decoding function.

BRIEF DESCRIPTION OF THE FIGURES

FIG. 3 is a representation of a frame of 8-bit PCM samples with mobile-to-mobile protocol bit stealing according to an embodiment of the invention;

FIG. 4 is a representation of a frame of VSELP signal according to another embodiment of the invention;

FIG. 5 is an illustration of the receiver state diagram;

FIGS. 8a–8g are flow diagrams showing the operations of the controller, message receiver and transmitters;

FIGS. 8h and 8i are flow diagrams of the PCM and VSELP input handler;

FIG. 10 is a table describing the speech decoder input information;

DETAILED DESCRIPTION OF THE PREFERRED EMBODIMENT

Figure 1:
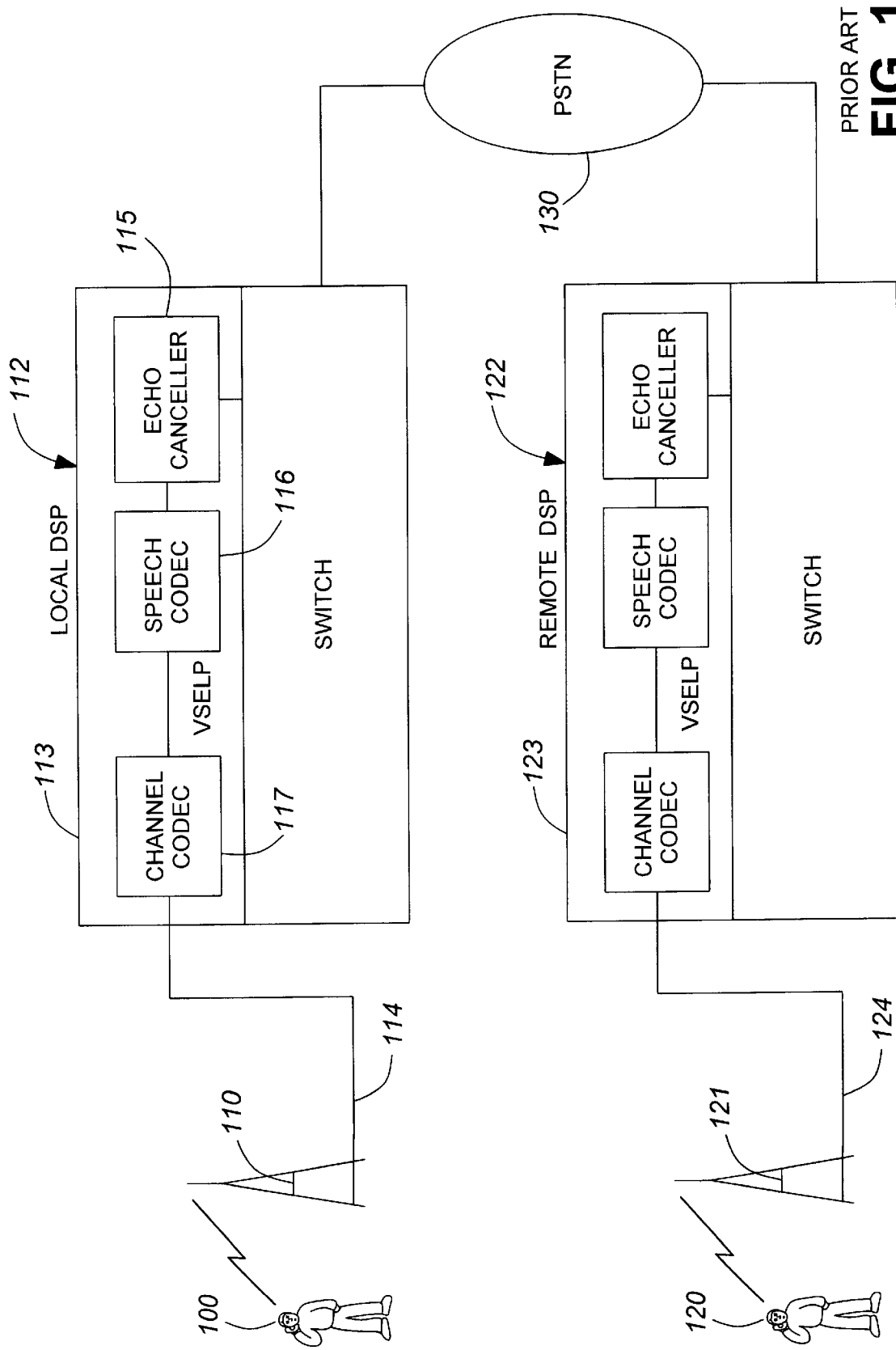
FIG. 1 is a block diagram illustrating a mobile-to-mobile connection over two digital speech processors at the switch side of a network.

Referring to FIG. 1, we have shown a block diagram illustrating a network connection between two cellular subscribers. In this embodiment, the subscribers communicate over the Public Switched Telephone Network via separate telephone exchanges. However, in some instances, it is possible for two subscribers to communicate with each other via the same telephone exchange. For example, a mobile telephone exchange such as Northern Telecom's DMS-MTX can be connected to as many as 250 cell sites. Thus, it is possible that within a small city, all cell sites are serviced by the same mobile exchange. Accordingly, a single mobile exchange could in effect service two subscribers that require a communication link to each other.

In FIG. 1, a first subscriber 100 is communicating with a second subscriber 120 via a first cell site 110 and mobile telephone exchange 112 and a second cell site 121 and mobile telephone exchange 122. The first and second mobile telephone exchanges communicate with each other over the PSTN 130.

As indicated above, the Digital Signal Processors 113 and 123 can either be part of peripheral equipment connected to the switch or part of the cell site infrastructure. The digital signal processors provide the capability of voice transcoding from mu-law (or A-law PCM depending on which standard is being used) to VSELP (Vector Sum Excited Linear Prediction) and vice-versa. Multiple DS-1 carrier interface circuits are used to distribute voice and control messages to and from the cell sites via trunks 114 and 124.

Digital signal processors are generally comprised of multiple signal processors commercially available from a number of suppliers. One such processor is Motorola's 560001 DSP.

In a TDMA mobile-to-land connection, audio signals arriving at the digital signal processor from the land source, i.e. PSTN 130, is first subject to echo cancellation at echo canceller 115. The echo cancelled signal is then compressed at speech codec 116 into IS-54 VSELP signal format with a 8:1 ratio and the compressed signal is channel encoded at channel codec 117 and sent over the air to the mobile subscriber 100 via the radio unit or cell site 110. VSELP signal arriving at the mobile is channel decoded and then used to reconstruct the original audio signal by the speech decoder. The entire speech encoding and decoding process introduces perceptible coding noise to the reconstructed speech signal. Audio signal travelling in the reverse direction (mobile to land) is subject to the same encoding and decoding processes but with no echo cancellation by the digital signal processor. Echo cancellation is provided on the PSTN side of the connection to eliminate the effects of delays introduced by the speech coding and TDMA transmission processes. The connection from the digital signal processor to the mobile is equivalent to a four wire connection with substantial delays due to speech coding and TDMA transmission. The echo occurs on the network side and is therefore cancelled in the digital signal processor.

When a TDMA mobile-to-mobile connection such as shown in FIG. 1 is realized, two TDMA mobile-to-land calls are basically connected back to back between two digital signal processors on the switch side in this case. An audio signal travelling in either direction is subject to two speech encoding and decoding processes operating in tandem. Thus, the coding noise introduced at each end degrades the quality of voice signal received by each subscriber.

The codec bypass feature of the present invention is designed for TDMA mobile-to-mobile communications realized with two bypass-capable digital signal processors connected on the switch side. Here, we define connected on the switch side as meaning that the digital signal processor operations are done at the switch end instead of the cell site end of the cellular infrastructure. As indicated before, some cellular infrastructures have digital signal processors connected at the base station end of the link such that echo cancellation, speech coding and channel coding is done at the cell site.

Codec bypass realization is based on determining that one digital signal processor is directly linked with another (or itself) in a mobile-to-mobile connection. The bypass feature consists of two components: a digital signal processor communication protocol and speech codec bypass mechanism.

Figure 2:
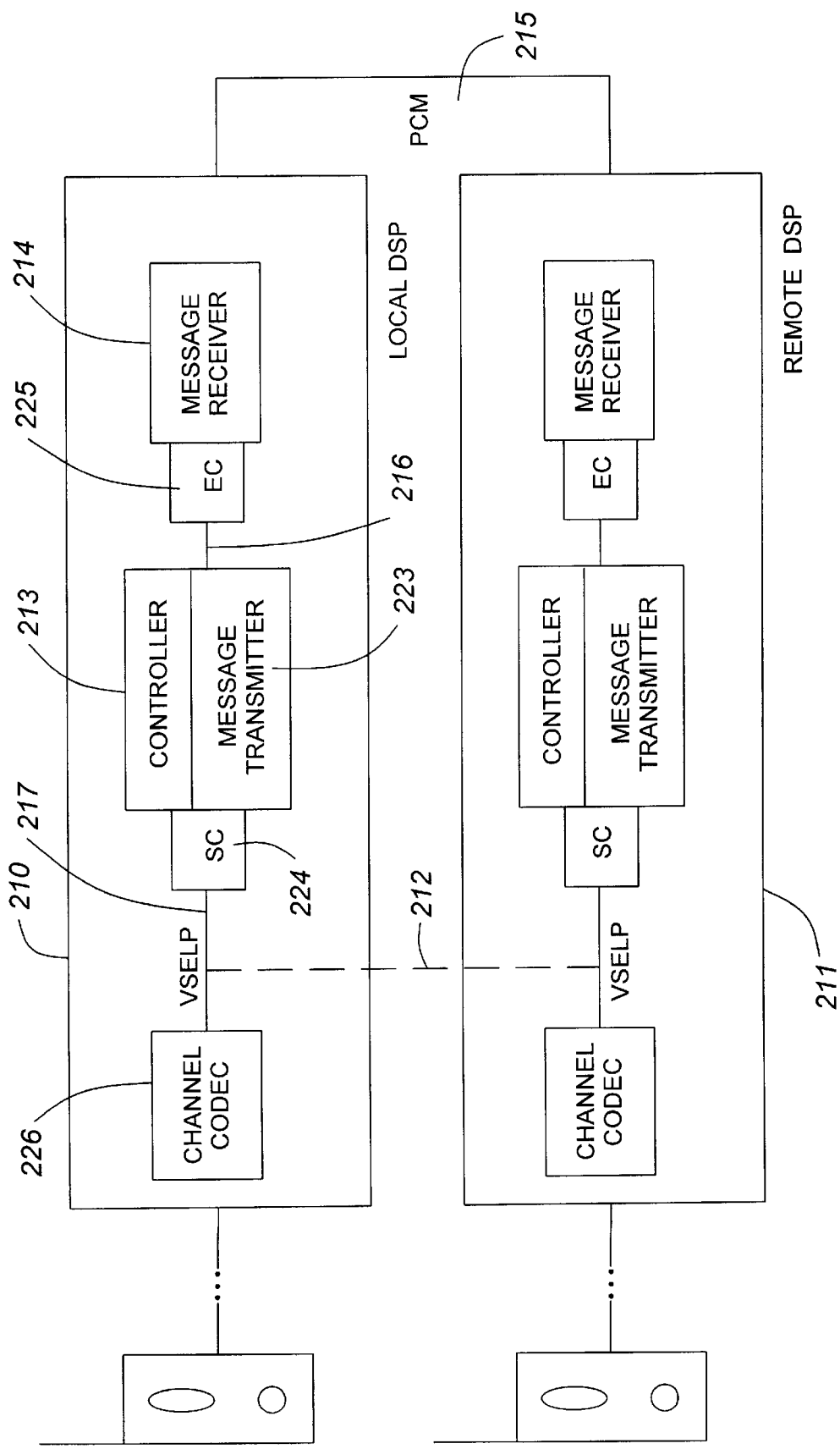
FIG. 2 is a block diagram illustrating a mobile-to-mobile connection with the codec by-pass feature activated according to an embodiment of the invention.

As will be illustrated with reference to FIG. 2, the digital signal processor communication protocol is used to set up communication between two enhanced digital signal processors 210 and 211 in the same mobile-to-mobile connection. Upon successful handshakes, each digital signal processor activates the bypass mechanism to transmit the mobile audio signal in VSELP format to the other digital signal processor, and speech codec bypass is completed. Note that broken line 212 is not a physical path, but represents a virtual or logical path between the two digital signal processors.

The communication protocol is active at all times to establish and maintain communication with the remote digital signal processor. In the embodiment of FIG. 2, the local digital signal processor is indicated at reference numeral 210 and the remote digital signal processor at reference numeral 211. The communication process is done via inband signalling and is independent of the echo cancellation, speech encoding/decoding and channel encoding/decoding applications. The communication protocol operations are transparent to the system users in all TDMA connections: mobile-to-land and mobile-to-mobile.

As will be explained later in further detail, the protocol design consists of three functional modules: a message receiver, a controller, and a message transmitter. They are responsible for in-band signal detection, dialogue and by-pass control and in band signal transmission, respectively. Operations of the message receiver and the message transmitter are independent of each other. The message controller serves as a link between them to update the message transmitter state on message receiver outputs.

An outgoing signal 215 of a bypass-capable digital signal processor for a TDMA channel is transmitted to the switch at a rate of 64 Kbps in both PCM or codec bypass modes. The signal is composed of two types of information—local mobile user audio signal and in-band signalling information. Format of the user audio signal and in-band signal are switched/changed in different stages of the inter-processor communication process.

Local mobile audio signal is transferred to the remote mobile in either of two formats. In non-VSELP bypass mode, the information is sent as a sequence of 8-bit PCM samples. In codec bypass mode, frames of VSELP signal, augmented to a 64 Kbps data stream, are sent.

Two types of protocol messages are defined. Specifically, two messages of equal length are available for the PCM sample sequence from the speech decoder output 216 and one message is for the VSELP byte stream from the speech decoder input 217 (see FIG. 2).

The first message defined for the PCM sequence is the digital signal processor identifier, and the second is the acknowledgment to a remote DSP identifier. By default, the local digital signal processor 210 transmits speech decoder output together with DSP identifiers in the reverse direction toward the switch. These messages are transmitted at a rate of 400 bits per second on the 64 Kbps digital link. Due to limitations of channel bandwidth in PCM transmission, bit stealing is in place to realize inband signalling. Each PCM message bit is sent by replacing a single user audio signal bit from an 8-bit PCM sample. This bit stealing scheme takes place at a regular interval. The bit location in a PCM byte and the bit stealing interval are selected to minimize the perceptual impact on the PCM signal at the receiver.

In bypass mode, each frame of 20 ms VSELP signal is also transmitted at a rate of 64 kbps. The protocol prefixes the outgoing VSELP information, 159 bits for a 20 ms frame, with the VSELP message for VSELP signal identification. Note that the Table shown in FIG. 10 shows the 159 bit frame plus 3 CRC bits for a total of 162 bits. Given that a frame of VSELP data occupies a fraction of the bandwidth provided by the digital channel, the protocol augments the VSELP byte stream with additional information pertinent to the VSELP frame such as VSELP check sum.

FIG. 3 shows a frame of 8-bit PCM samples superimposed with PCM message information. Here, X represents a PCM information bit and 0 is a message bit. In the figure, bit stealing takes place on every third PCM sample. However, during an actual call, PCM bit stealing would be done at 1 bit every 20 samples. This rate is of course dependent on the operational parameters of the system.

As will be defined later, FIG. 4 illustrates the structure of a VSELP frame containing a VSELP message and VSELP signal.

A Receiver State Machine and a Transmitter State Machine govern the protocol operations. The receiver state machine has two states as shown in FIG. 5 for PCM and VSELP inputs, respectively, from the switch. State transitions occur on a 20 ms frame basis. The system enters and stays in state R1 for 20 ms in the absence of a VSELP message at the beginning of the input frame. It enters and stays in state R2 for 20 ms immediately after a VSELP message is detected. Under normal TDMA mobile-to-land communication, the machine always operates in state R1. During codec bypass in a TDMA mobile-to-mobile call, it operates in state R2.

Figures 6, 7:
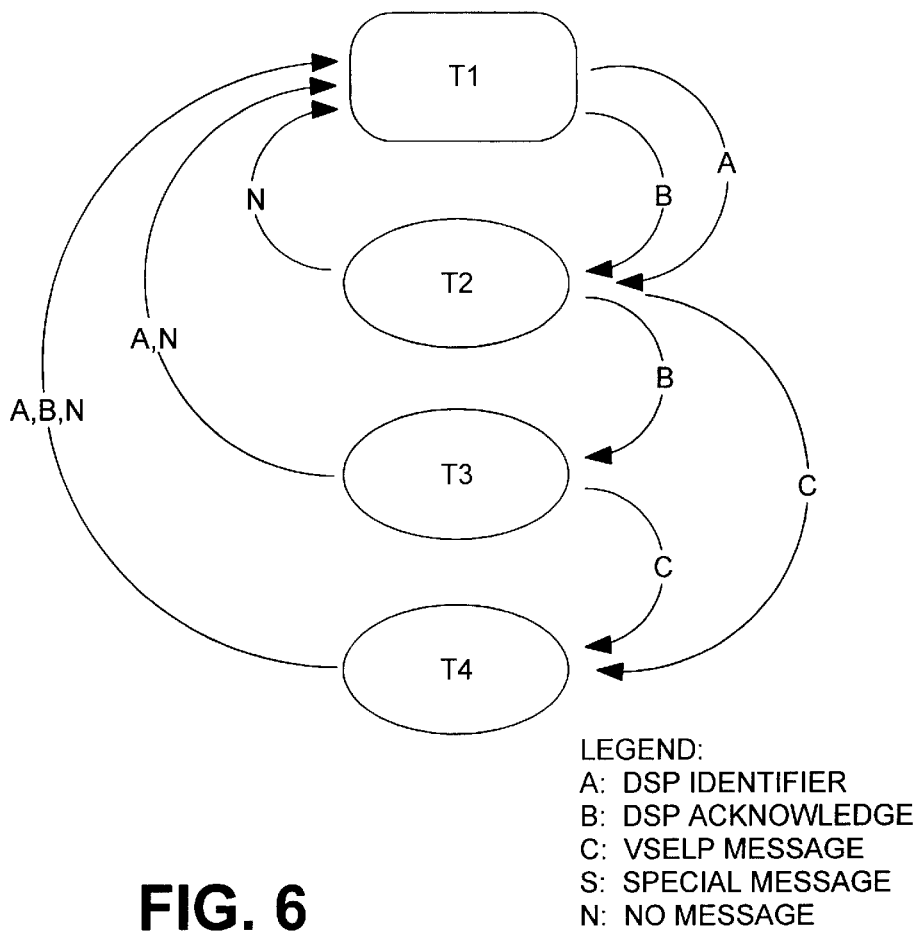
FIG. 6 is an illustration of the transmitter state diagram.
FIG. 7 is a table showing the transmitter state machine output for the diagram of FIG. 6.

The transmitter state machine, shown in FIG. 6, has four states—T1 through T4. Each state dictates the type and format of local mobile signal to the remote digital signal processor, if available. Each state also determines the type of messages to write to the output stream—DSP Identifier, DSP Acknowledgment, or VSELP message. State transition is prompted by the received remote DSP messages.

The table of FIG. 7, shows the digital signal processor output definitions. Each state is characterized by the transmission of a single user signal format and protocol message type. A protocol message is always written to the output 216 (see FIG. 2). State T1 is the system's initial and default operating state. In case of a loss of synchronization with the remote DSP message, the transmitter state machine returns to state T1 regardless of the current state. In state T1, the message transmitter 223 superimposes PCM message "DSP Identifier" on the output PCM sample sequence. This is so even in the absence of a remote bypass-capable digital signal processor. The protocol does not switch to state T2 until the presence of a remote digital signal processor 211 is confirmed by an incoming "DSP Identifier" or multiple "DSP Acknowledge" at receiver 214. The "DSP Acknowledge" message is sent by the transmitter in state T2 to acknowledge the receipt of the remote "DSP Identifier". The transmitter transmits the user signal in VSELP format in both states T3 and T4. The protocol switches to state T3 when a "DSP Acknowledge" to its own identity is received from the remote digital signal processor. The objective of this handshaking process is to ensure a sane two-way communication and smooth transition before establishing the connection in VSELP bypass mode. State T4 is the final state in which the TDMA mobile to mobile connection is in full duplex codec bypass mode. Although both states T3 and T4 specify VSELP signal transmission, state T4 is entered only when the input to the digital signal processor is also in VSELP format. A fifth state, not shown in FIG. 6, is entered when special system messages are received. In this state, the speech decoder output thus proceeds unchanged to the echo canceller 225 and the PSTN 130.

State T1 is entered again whenever there is a removal of the special messaging or a loss of synchronization.

Figure 8A:
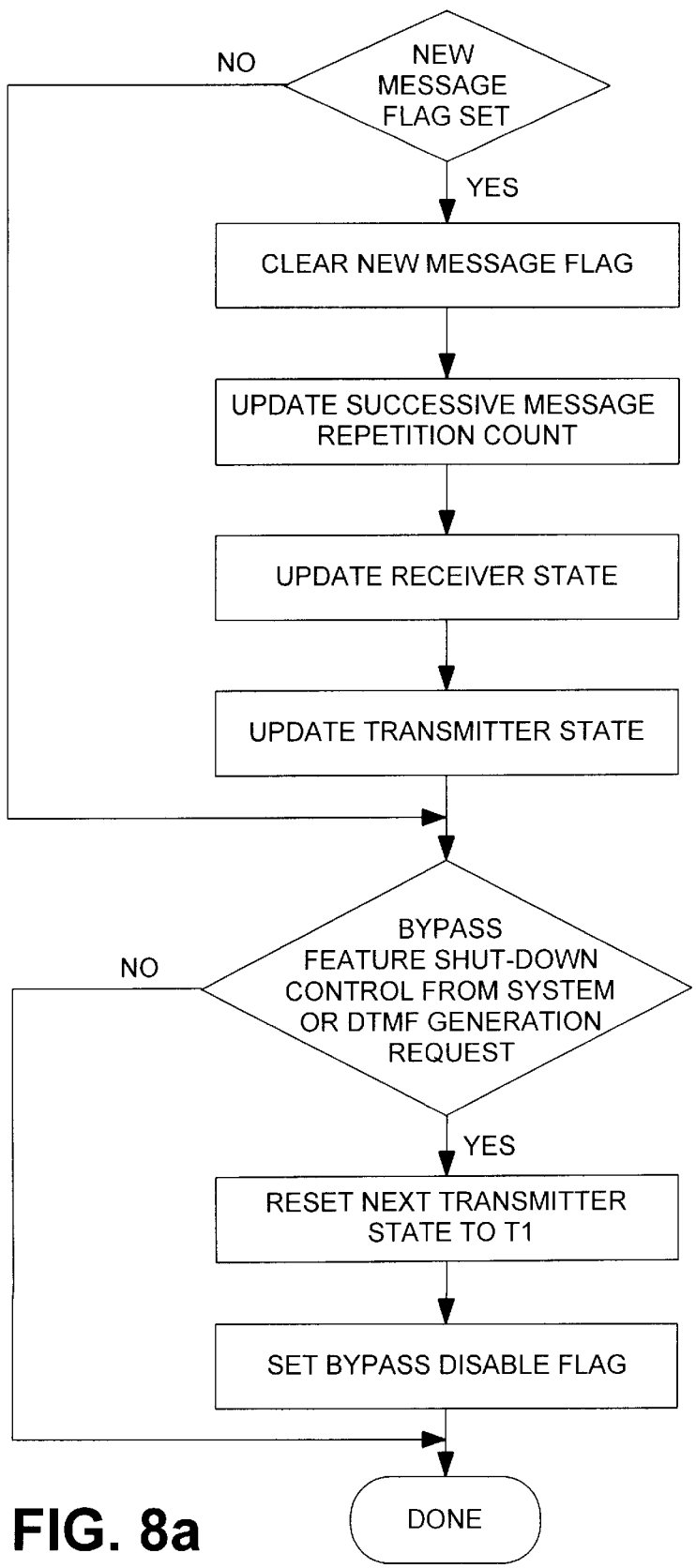
Figure 8B:
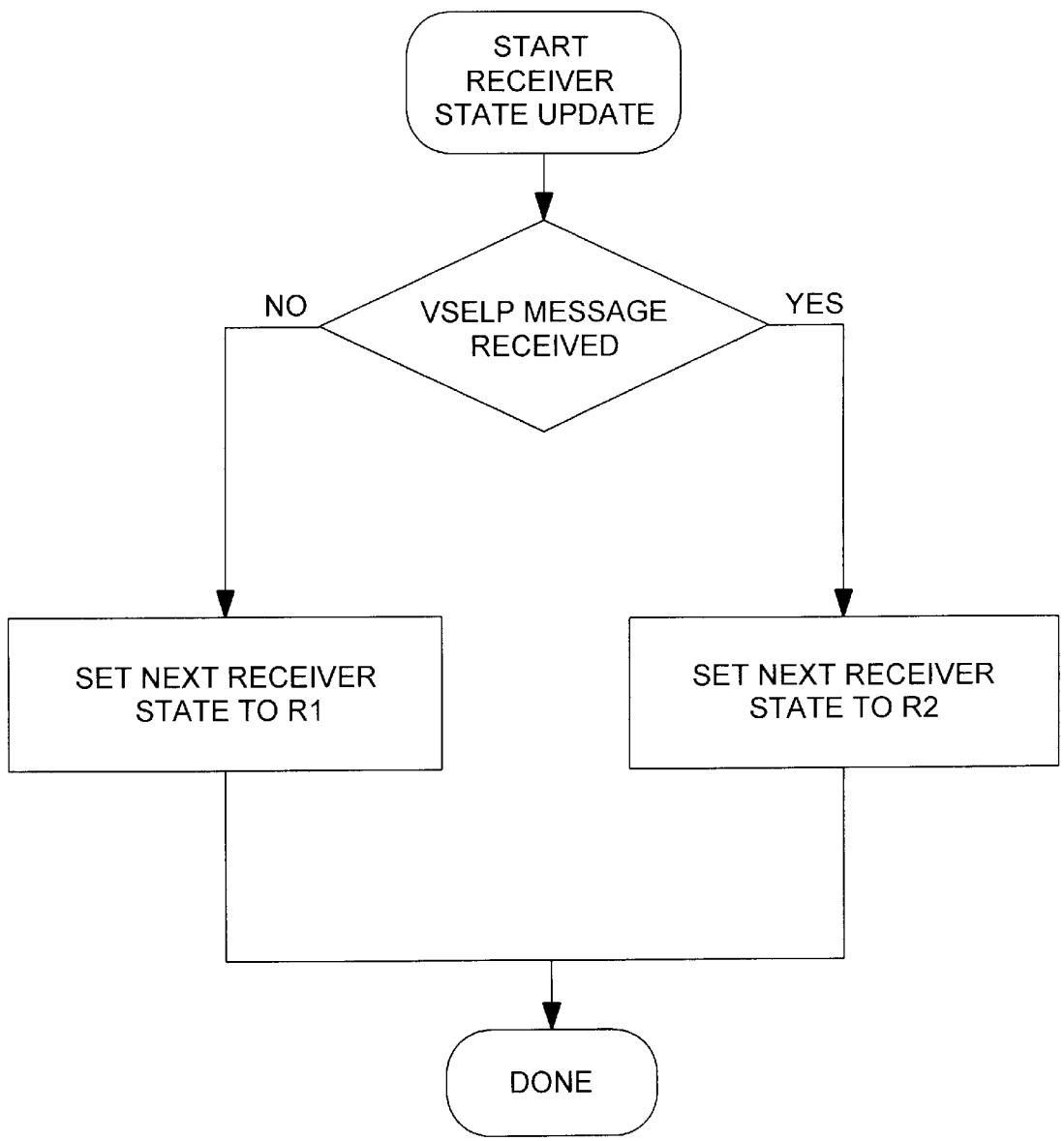
Figure 8C:
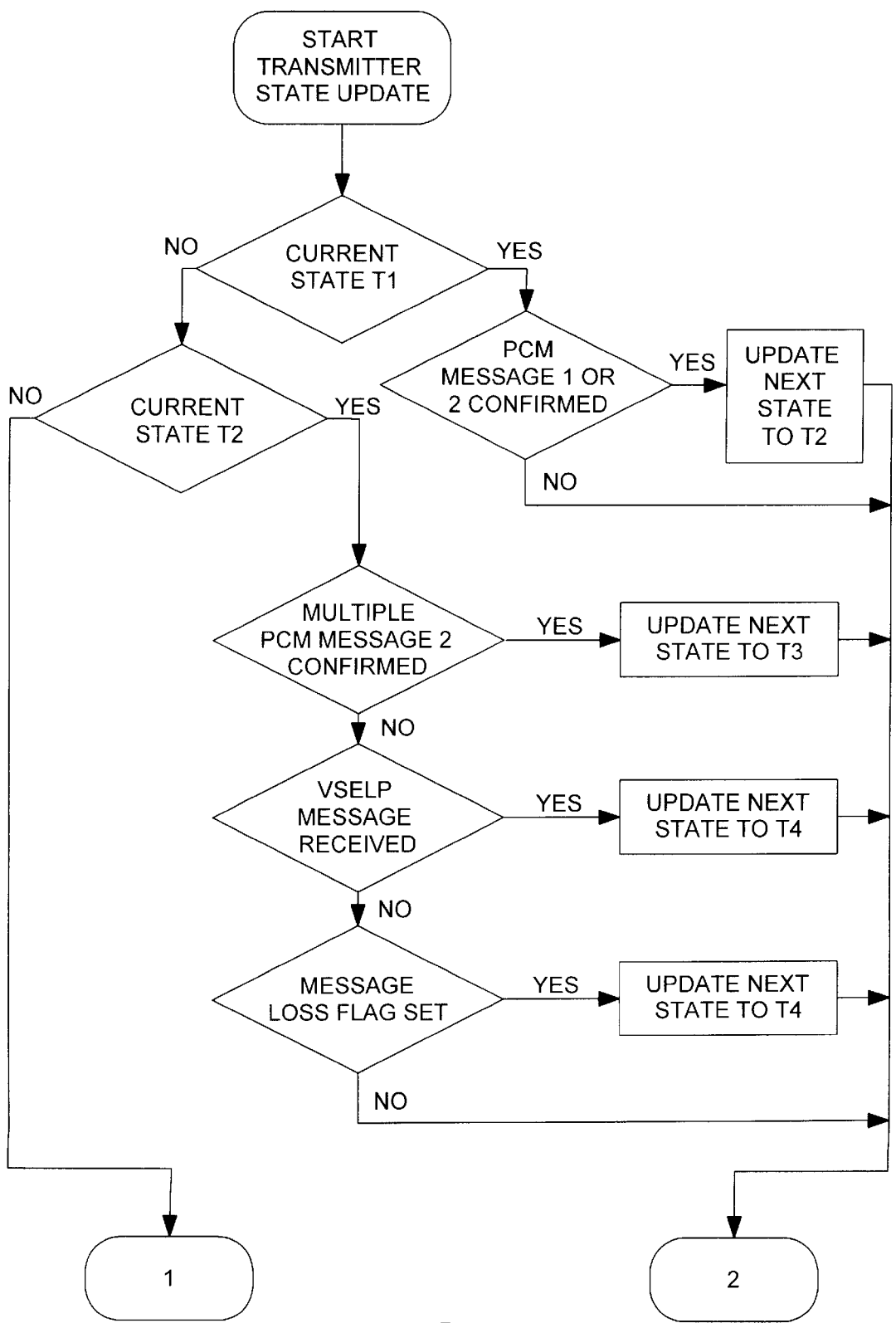
Figure 8D:
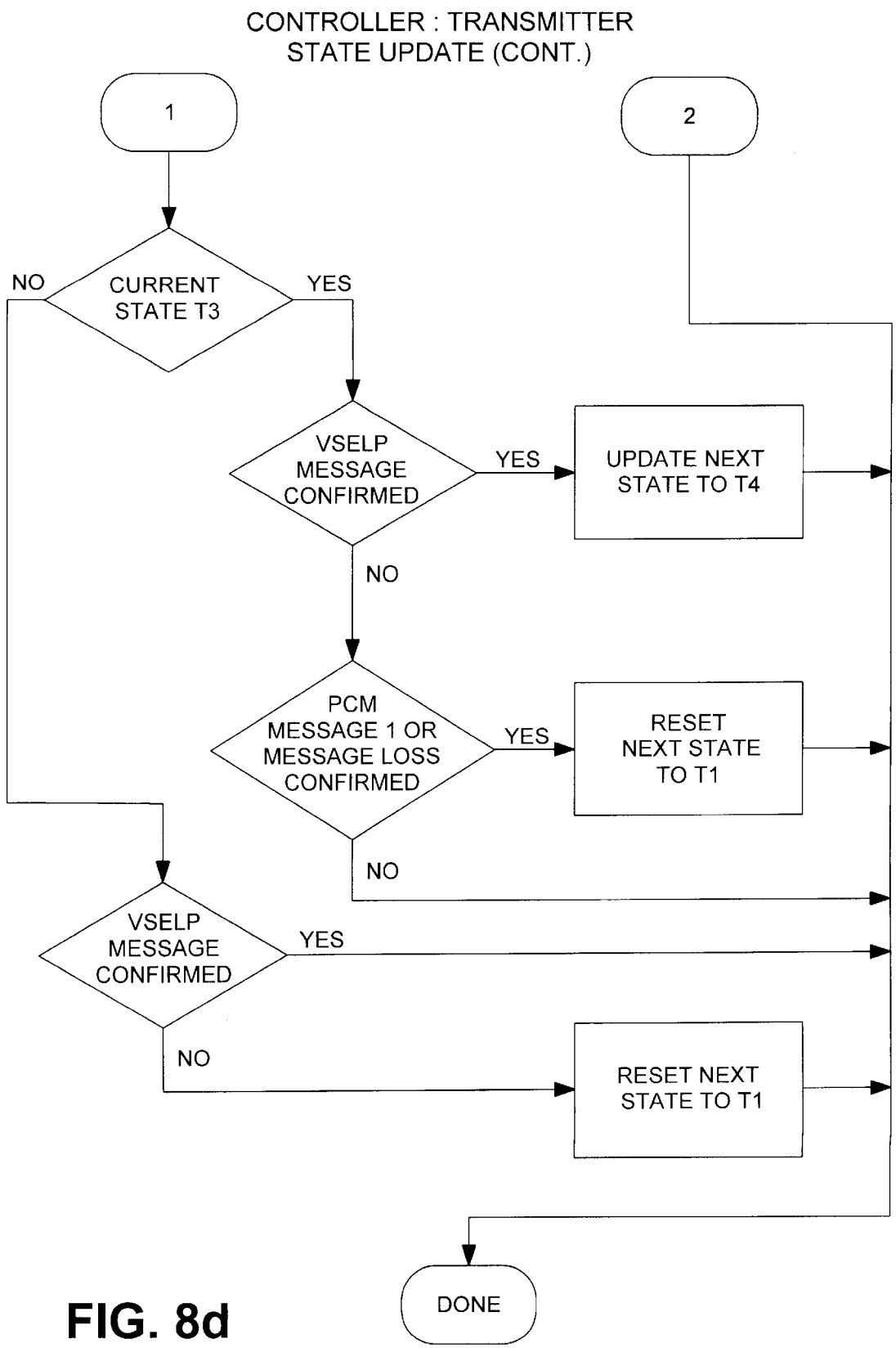
Figure 8F:
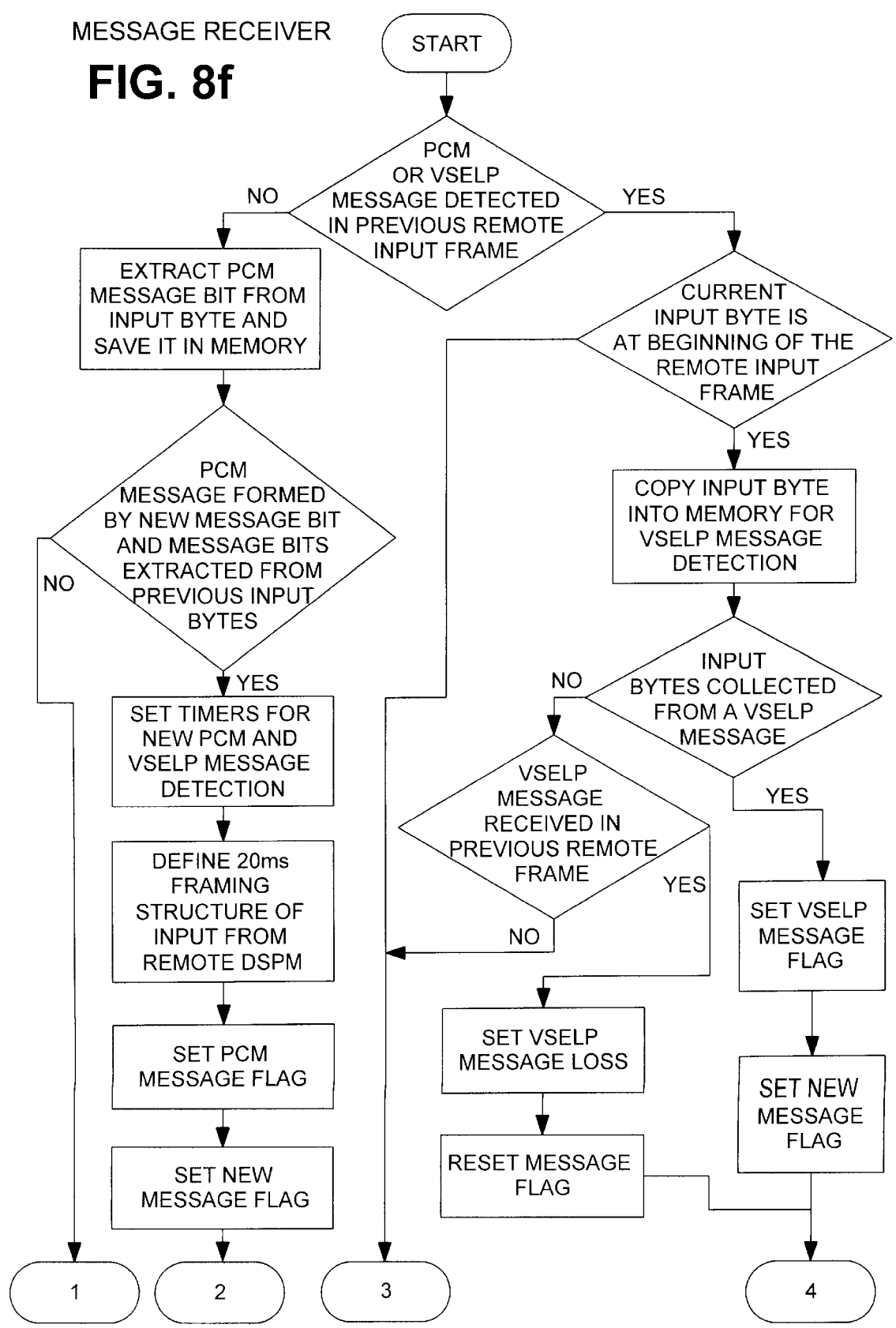
Figure 8G:
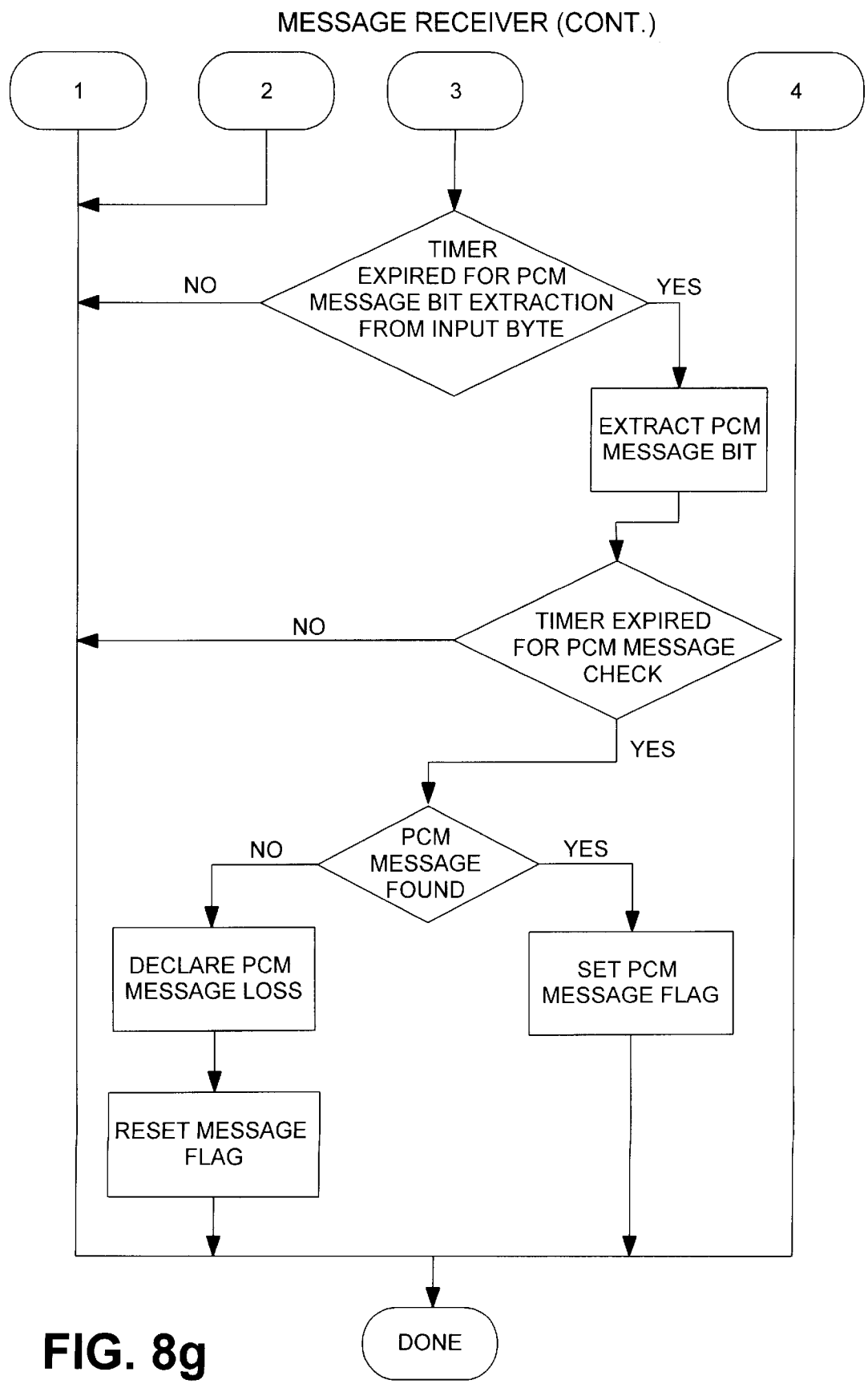

This provision is necessary in applications such as mobile activated DTMF tone generation where a DTMF tone is generated on the Speech Coder and available in PCM format only. This design also provides the switch with the capability to manually disable the codec bypass feature. FIGS. 8a to 8i are flowcharts representing the operating instructions of the transmitter and receiver state machines, message transmitters and receivers and the PCM and VSELP input handler. FIG. 8a shows the controller flowchart. Since a state transition occurs on a 20 ms. basis, the controller is called once every 20 ms. FIG. 8b shows the receiver update flowchart as initiated by the controller. That is, the receiver state is set to R1 or R2 depending on whether a VSELP message is received. The transmitter state machine is updated through 4 separate states as shown in FIGS. 8c and 8d, where state T1 is the system's initial and default operating state. FIG. 8e is the operations flowchart of the message transmitter 223 shown in FIG. 2. The transmitter is called once every 20 ms. Each PCM message is transmitted over multiple 20 ms. frames of PCM samples. The VSELP signal is split up and written into the least significant part of the output buffer entries. The most significant part of the entries has a bit pattern resembling low amplitude PCM samples. This is done in order to reduce the perceptual impact when the VSELP signal is falsely received as PCM samples. The operations flowchart of the Message receiver 214 of FIG. 2 is shown in FIGS. 8f and 8g. The message receiver is called once for every input sample. The beginning of an outgoing PCM or VSELP message is synchronized with the beginning of a 20 ms. frame by the message transmitter. Detection of a remote PCM or VSELP message therefore defines the beginning of the remote framing structure seen by local digital signal processor.

Figure 8I:
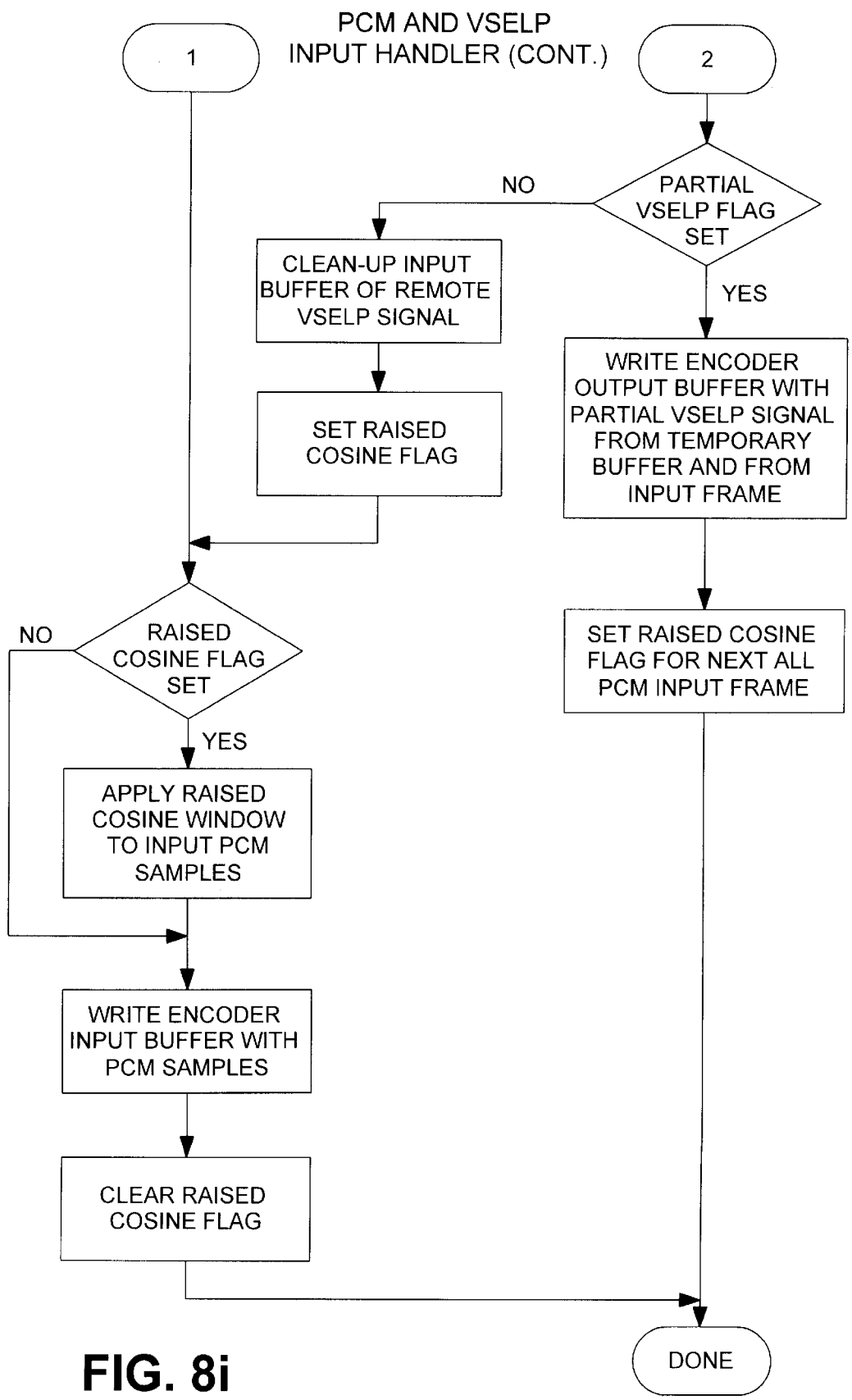

FIGS. 8h and 8i describe the routine used to handle linearized PCM samples or VSELP signal from the switch. The PCM and VSELP handler routine is designed to properly read the PCM or VSELP input data at different operating mode. The PCM and VSELP handler routine is done at the speech encoder input. Note that in FIG. 8i, the half cycle raised cosine window is off by default. It is turned on at VSELP to PCM transition for the first complete PCM sample frame after the transition. The PCM samples are attenuated by the cosine window whose weight ranges from zero to unity such that a smooth transition becomes effective with zero initial state. The PCM input samples to this routine are in 16-bit linear format.

As indicated earlier, the protocol design consists of three functional modules: a message receiver 214, a controller 213, and a message transmitter 223. They are responsible for in-band signal detection, dialogue control and in band signal transmission, respectively. Operations of the message receiver and the message transmitter are independent of each other. The message controller serves as a link between them to update the message transmitter state on message receiver outputs.

The function of the message receiver 214 is to detect and identify in-band signalling information in the input from a remote digital signal processor 211. It operates on a sample by sample basis asynchronous to the local digital signal processor TDMA framing structure.

By default, the local digital signal processor 210 receives PCM input signals from the switch side and the message receiver 214 attempts to acquire synchronization with incoming protocol messages. During PCM signal reception, the message receiver 214 monitors the designated bit of each input byte. It is only after multiple DSP identifiers are received that the presence of a remote digital signal processor 211 and a clear digital connection is confirmed. Upon validating the DSP identifiers, the message receiver operations are in synchronization with the framing structure of the remote digital signal processor 211. The message receiver continues monitoring the input byte stream for new protocol messages. Remote digital signal processor to local digital signal processor codec bypass on virtual or logical path 212 is confirmed upon receiving VSELP message at the beginning of a remote incoming frame. Synchronization with the remote digital signal processor is lost when the message receiver fails to detect new PCM or VSELP messages in the input, and the message receiver returns to operate in the synchronization acquisition mode.

The controller 213 operates the transmitter and receiver state machines on message receiver outputs and also on the presence of any special messages to determine the proper operating mode of the state machines.

The message transmitter 223 is responsible for writing the output buffer with the local mobile audio signal and the protocol messages in the proper format. It superimposes the "DSP identifier" or "DSP Acknowledge" messages on the DSP PCM output sequence, or it constructs a VSELP output frame with VSELP message and information bytes. The table of FIG. 7 shows the transmitter output format and the corresponding message types for different transmitter states.

The message transmitter operation is driven by the controller 213. The operation is also in synchronization with the local TDMA framing structure. As shown in FIG. 3 and FIG. 4, each message bit is written to well-defined locations in the 20 ms (160 bytes) output byte sequence. Each selected message is transmitted in full length. The transmitter does not write a new message to the output stream until the last bit of the current message is sent.

The loose coupling between the message receiver and message transmitter of the protocol design has two advantages. First the message receiver does not have to be in synchronization with the local TDMA framing structure. Due to the effects caused by transmission delay, a 20 ms frame from the remote digital signal processor is not necessarily synchronized to a local TDMA frame upon arrival. The protocol design allows the message receiver to lock onto the input message regardless of the local TDMA timing. The second advantage is that data type traversing in opposite directions on the DSP/DSP digital link can be asymmetrical. The signal format need not be PCM/PCM or VSELP/VSELP. While the local digital signal processor may be transmitting the local mobile user information in VSELP format, the remote digital signal processor may be responding with PCM samples because the remote signal processor has not yet received message C and therefore has not yet changed state from state T3 to state T4 (see FIGS. 6 and 7).

Echo Canceller Application

During the non-bypass mode of the bypass-capable digital signal processor, the speech codec 224 sends the 160 samples every 20 ms to the echo canceller 225 directly in 8-bit PCM format. The linear to PCM conversion operations are executed directly on the speech decoder output on the speech codec. The resulting PCM bytes are delivered to the echo canceller 225 from the speech codec and then written to the digital signal processor output 215 on the switch side for the designated TDMA channel without further signal processing on the echo cancellerL.

During codec bypass in the local digital signal processor 210 to remote digital signal processor 211 direction, the user audio signal data is taken directly from the speech decoder input—channel decoder output—217 in the form of VSELP compressed signal, framed with VSELP messages. It is sent via the echo canceller 225 to the digital signal processor output. A total of 160 bytes—in either PCM or VSELP format—is received at the input/output buffer of the echo canceller 225 for each TDMA voice channel every 20 ms.

The bypass-capable echo canceller software transmits the echo cancelled samples to the speech codec in a 16-bit linear format, in two bytes via the input/output buffer. In addition, signalling information from the message receiver on the echo canceller is transmitted to the controller on the speech codec. This information includes the number of remote VSELP bytes in the input/output buffer frame, remote message type and remote message error count.

The echo canceller 225 for a TDMA channel is skipped as soon as the presence of a remote digital signal processor 211 is confirmed by the message receiver 214. Also, the canceller is not required since no hybrid is in the direct digital signal path. After a remote digital signal processor is confirmed, input samples to the echo canceller from the remote digital signal processor will undergo PCM to linear conversion only. The resulting 16-bit linear samples are written to the echo canceller input/output buffer for the speech codec as if they were echo cancelled samples.

VSELP input bytes from the remote digital signal processor are processed differently. When an incoming 20 ms frame—160 bytes—of VSELP signal is confirmed by the message receiver 214, every validated VSELP byte from the remote digital signal processor 211 is directly written, accompanied by a zero byte, to the input/output buffer for the corresponding speech codec.

Thus, a total of 320 bytes are sent to the speech codec by the echo canceller every 20 ms via the same buffer. The signal is echo cancelled in the absence of a remote digital signal processor. Otherwise, the signal is sent directly from the echo canceller to the input/output buffer for the speech codec.

Speech Codec Application

The controller and message transmitter on the Speech Codec are invoked once every 20 ms. The controller takes input from the message receiver in each input/output buffer and executes the state machine to determine the next transmitter state (see FIGS. 8a–8g). The message transmitter serves as a slave to the controller and writes the 20 ms input/output buffer with the proper data and message for the echo canceller.

Figure 9:
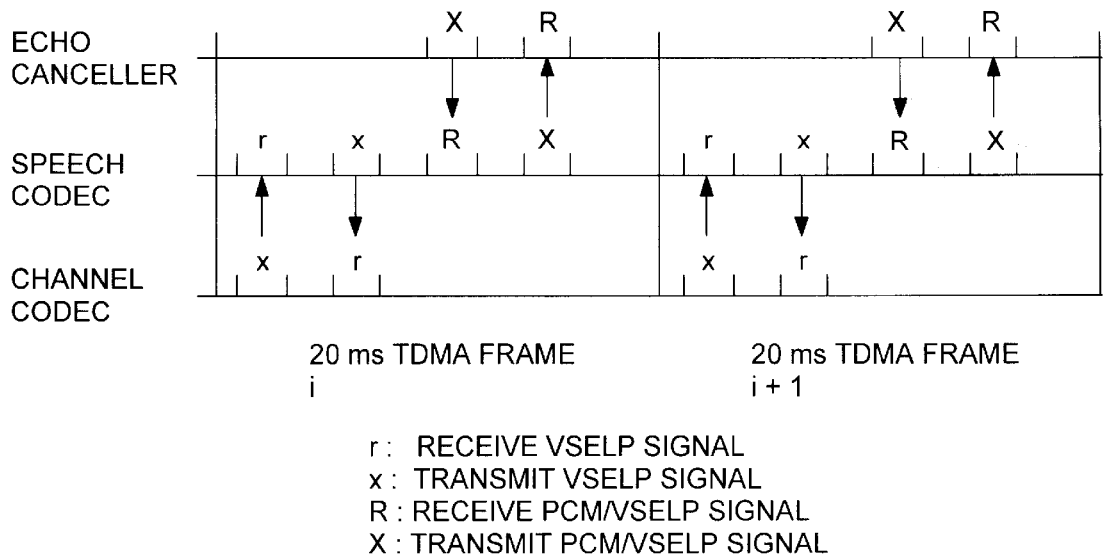
FIG. 9 is a diagram illustrating the schedule of inter-application communication for PCM and VSELP signal transfers.

FIG. 9 shows an example of the schedule of the speech codec communication with the echo canceller and channel coder. With reference to FIGS. 2 and 9, we note that after the VSELP signal transfer from channel codec 226 to speech codec 224 is completed, the speech decoder 224 and the message transmitter 223 are activated in this order. In the case of codec bypass, in the local digital signal processor to remote digital signal processor direction, the decoder is not activated. The output of this process is loaded in time slot "X" to the input/output buffer to be sent to the echo canceller within the same 20 ms TDMA frame (FIG. 9).

After the speech codec receives the input/output buffer from the echo canceller, the controller is activated to update the state machine based on new information from the message receiver. The speech encoder is invoked, if needed, to compress the linear input samples. The compressed speech signal is sent to the channel codec in time slot "x" in the next 20 ms frame.

Two types of data can be transferred from the speech codec to the echo canceller. This data can be the speech decoder output or the speech decoder input, depending on the state of the local message transmitter. In either case, 160 bytes are written to the input/output buffer for the echo canceller.

In the bypass-capable digital signal processor software design, the linear to 8-bit mu-law/A-law PCM conversion is activated for speech decoder output samples in non-VSELP bypass mode. The resulting PCM samples—sequence of 8-bit bytes—are superimposed with a PCM message as illustrated in FIG. 3.

During codec bypass, the message transmitter writes directly into the input/output buffer the speech decoder input in VSELP format. Each 20 ms frame of VSELP signal to the speech decoder input consists of 159 bits of compressed speech signal and 3 bits of CRC state information. This information is presented to the speech decoder input in 28 bytes in the order as shown in the table of FIG. 10.

The message transmitter breaks up these 28 VSELP information bytes into 4-bit units and writes every unit into a separate input/output buffer entry with the most significant units first. Specifically, each 4-bit unit is written to the input/output byte starting at the second least significant bit or bit one "1" to prevent potential conflict with T1 signalling information on a T1 trunk between two digital signal processors in a mobile-to-mobile call. The remaining most significant bits of each input/output buffer byte is filled with a fixed pattern such that the complete byte is seen as a mu-law/A-law PCM code of small magnitude. This is done to reduce the undesired perceptual effect when the VSELP signal is falsely recognized or received as PCM signal.

Thus, the input/output buffer contains the VSELP message bytes followed by 28×2 size VSELP information bytes. An additional check sum byte is appended to the information bytes. The remaining input/output buffer entries are also filled with the same fixed pattern for the same purpose.

Two types of data received from the remote digital signal processor are transferred—16-bit linear sample sequence and VSELP byte stream.

Due to the effects of transmission delay, a frame of VSELP compressed signal from the remote digital signal processor may not coincide with the local 20-ms frame structure in a direct TDMA mobile-to-mobile connection.

Figure 11:
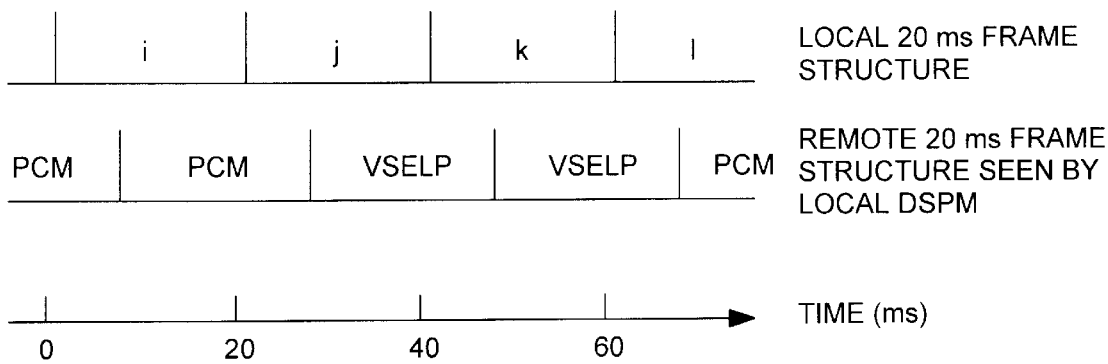
FIG. 11 is a diagram illustrating the TDMA frame structure between the echo canceller and speech codec.

As illustrated in FIG. 11, the content of a local 20 ms frame of data from the echo canceller to the speech codec has the following combinations:
all linear samples (frame i)
linear samples followed by VSELP signal as in PCM to VSELP transition (frame j)
VSELP signal from two adjacent 20 ms frames (frame k, see section C below)
VSELP signal from one single 20 ms frame (frame k, see section C below)
VSELP signal followed by linear samples as in VSELP to PCM transition (frame 1).

As indicated earlier, the echo canceller sends to the speech codec signalling information in addition to the user speech signal. This signalling information includes a VSELP byte count in each 20 ms input/output buffer transfer. A count of zero indicates an all linear sample transfer and a non-zero count denotes the number of valid VSELP byte available in the transfer. The content of each input/output buffer is read with special care in the presence of VSELP signal. Examples of PCM and VSELP signal transfer and management, implemented in the bypass-capable digital signal processor load are as follows:

A. All linear sample transfer

When the VSELP byte count is zero, the complete 20 ms frame of linear samples is processed by the speech encoder as usual. Remote 20 ms framing structure has no effect on the local encoding process.

B. Non-zero VSELP byte count following an all linear sample transfer

This combination signals a PCM to VSELP—non-VSELP to codec bypass—transition. One of two actions are taken to reconstruct a frame of VSELP information for the channel encoder. The selection decision is based on completeness of VSELP information in each input/output buffer transfer.

If the relationship between the local and remote framing structure is such that all remote VSELP information for a 20 ms speech frame reproduction falls in a single input/output buffer transfer, the VSELP information is reformatted and sent to the channel codec (CC) directly without invoking the speech encoder. The reformatting process involves extracting and concatenating the 4-bit units, most significant units first, to reconstruct the 28 VSELP information bytes.

If the framing relationship is such that the remote VSELP information for each 20 ms speech frame crosses the boundary of two adjacent local frames, the VSELP information is available in two input/output buffer transfers. The VSELP information available in the current local frame is stored in memory to be combined with the remaining VSELP information available in the next transfer. After being copied to memory, this partial VSELP information in the input/output buffer is replaced by linear samples of zero amplitude. The entire frame in the input/output buffer is then considered to contain all linear samples is delivered to the speech encoder to be compressed.

C. Consecutive frames with non-zero VSELP byte counts

During remote to local digital signal processor bypass, consecutive input/output buffer frames from the echo canceller to the speech codec are filled up with VSELP signal. The VSELP byte count equals its maximum and remains constant until the local digital signal processor loses synchronization with the remote VSELP signal. During a VSELP to PCM—VSELP to non-VSELP bypass—transition, the local 20 ms frame contains partly VSELP signal and partly PCM linear samples with the VSELP byte count less than its maximum.

Stable Codec Bypass: All VSELP Transfer

If there is enough VSELP information for a 20 ms speech reproduction, the VSELP bytes are reformatted and sent. Otherwise the buffer contains two sets of partial VSELP information from two adjacent 20 ms frames. In this case, a frame worth of VSELP information is reconstructed with the partial VSELP information stored in the memory from the previous input/output buffer transfer and the first set of VSELP information available in the current input/output buffer transfer. The reconstructed VSELP information is reformatted and sent to the channel codec. The memory is then updated with the second set of VSELP information to be used in the next frame.

VSELP Synchronization Loss: Partial VSELP Transfer

If there was enough VSELP information for a 20 ms speech reproduction in the previous input/output buffer transfer, the entire input/output buffer transfer is processed as all linear samples by the speech encoder. If there is partial VSELP information stored in the memory, it should be combined with the partial VSELP information in the current frame reconstruct a frame worth of VSELP information as in the "All VSELP Transfer" case above.

Thus, the speech encoder is skipped whenever there is enough VSELP information for a 20 ms speech frame to reconstruction. Otherwise, all linear samples from the echo canceller are processed by the speech encoder. In either case, the speech codec presents to the channel codec the VSELP compressed information in the same format. Before the speech encoder/decoder is reactivated, the coder state is reset. This ensures that the coder will not start from an unknown state. After the transition from bypass to non-bypass, a smoothing cosine weighting function is applied to the first PCM frame arriving from the remote processor to suppress any transition noise.

Cyclic Redundancy Check (CRC)

Figure 12:
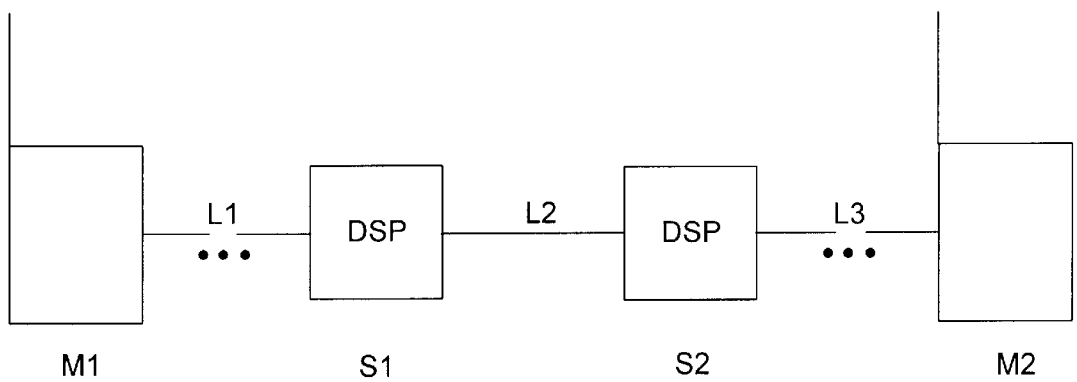
FIG. 12 is a block diagram illustrating the different signal paths and TDMA connections for mobile-to-mobile communication.

As shown in FIG. 12, a mobile-to-mobile TDMA call consists of three signal paths. Two of the paths are over the air between the mobiles and the respective digital signal processors, and the third path is between the two digital signal processors. Mobile-to-mobile TDMA calls are subject to channel errors on these three paths, though the error rates are not the same.

According to the IS-54 specification, each VSELP speech decoder runs a state machine driven by CRC conditions of the channel between the mobile and the land terminals. In the presence of continuous CRC errors, the speech decoder replicates the Linear Prediction Coefficients (LPC) information and frame energy from the previously received CRC error free transmission. In the latter case, an attenuation factor is applied. The bypass-capable digital signal processor load is designed in such a way that the mobile-to-mobile feature is transparent to the mobiles. The principal of the design is to make the tandem links look like a single TDMA channel to the end users. In a mobile-to-mobile connection, the IS-54 specified state machine is activated once only by the receiving mobile in response to a CRC error on path "L1i" and/or path "L3". The text below details the operations involved in response to a CRC error.

Lets assume that a CRC error is detected on path "L1" in the reverse direction by the channel decoder of "S1". Instead of exercising the state machine to replicate the LPC and frame energy as in a TDMA mobile-to-land connection, "S1" running in codec bypass mode would pass the 3-bit CRC state information together with the received VSELP signal to channel encoder in "S2". In addition to the defined IS-54 VSELP signal, the speech encoder also sends to the channel encoder in "S2" the received CRC status. A flag in the channel encoder is set for a nonzero CRC state from "S1"0 and clear otherwise. The channel encoder computes the CRC value for the received VSELP signal if the flag is set.

Instead of transmitting the calculated CRC along with the VSELP signal to mobile "M2", the channel encoder sends the 1's complement of the calculated CRC together with the VSELP signal for the first 6 consecutive CRC failures. A CRC mismatch is effectively forced on mobile "M2". In effect, a CRC error on path "L1" is seen by mobile "M2" as a CRC error on path "L3" and acted upon accordingly. The value of the 3-bit CRC state information received from "S1" by the speech encoder in "S2" is immaterial and is discarded after.

Transmission errors on path "L2" during codec bypass is monitored with a VSELP check-sum measure. During codec bypass, a VSELP check-sum is calculated on the outgoing 3-bit CRC state information and the 12 most perceptually significant VSELP bits by the message transmitter. The check-sum figure is transmitted to the remote digital signal processor in a VSELP frame. Upon receiving a frame of VSELP information, the remote digital signal processor calculates a new VSELP check-sum on the received 3-bit CRC state information and the received VSELP bits. The calculated VSELP check-sum is compared to the received VSELP check-sum of the same frame. If the two check-sums are different, a "CRC error" on path "L2" is detected and the remote channel encoder is signalled as in the previous paragraph.

Only one state machine for VSELP signal replication is activated in each end-to-end TDMA mobile-to-mobile connection. Continuity of state machine operation for signal replication is ensured. In the case with CRC errors present on more than one paths, the reconstructed signal frame energy is attenuated gradually as specified in IS-54 till total muting. If two independent state machines are activated in response to the consecutive or simultaneous CRC errors, fluctuation in the reconstructed signal frame energy will be observed.

The CRC computed is sent without modifications on the seventh or subsequent consecutive CRC failure. Instead, the frame energy 'R0' is set to zero to force a complete muting of the mobile audio signal on mobile 'M2'.

What is claimed:

1. A transmission system, comprising:
   a first signal processor;
   a second signal processor; and
   a transmission facility linking said first signal processor to said second signal processor;
   said first signal processor being operable to convert a traffic signal from a first signal format to a second signal format for transmission on said transmission facility to said second signal processor;
   said second signal processor being operable to reconvert said traffic signal from said second signal format to said first signal format;
   said first signal processor further being operable to transmit a control signal to said second signal processor;
   said second signal processor being responsive to said control signal transmitted by said first signal processor to send a control signal to said first signal processor; and
   said first signal processor being responsive to said control signal transmitted by said second signal processor to transmit said traffic signal to said second signal processor in said first signal format.

2. A transmission system as defined in claim 1, wherein the second signal processor is operable to:
   recognize that the first signal processor is transmitting the traffic signal in the first signal format; and
   in response to recognition that the first signal processor is transmitting the traffic signal ion the first signal format, to pass the traffic signal in the first signal format.

3. A transmission system as defined in claim 2, wherein:
   the first signal processor is operable to transmit a control signal to the second signal processor when the first signal processor begins transmitting the traffic signal in the first signal format; and
   the second signal processor is operable to recognize on receipt of the control signal that the first signal processor is transmitting the traffic signal in the first signal format.

4. A signal processor, comprising:
a signal format converter for converting a traffic signal from a first signal format to a second signal format;
a message transmitter for transmitting control signals;
a message receiver for receiving control signals;
a controller for controlling said signal format converter and said message transmitter, said controller operating said message transmitter to transmit a control signal when said signal format converter is enabled to convert said traffic signal from said first signal format to said second signal format and, in response to receipt of a control signal by said message receiver, to enable said signal format converter to pass said traffic signal in said first signal format.

5. A signal processor comprising:
a signal format converter for converting a traffic signal from a second signal format to a first signal format;
a message transmitter for transmitting control signals;
a controller for controlling said signal format converter and said message transmitter:
to transmit a control signal on receipt of a control signal;
to recognize that the traffic signal is being received in the first signal format; and
in response to recognition that the traffic signal is being received in the first signal format, to pass the traffic signal in the first signal format.

6. A signal processor as defined in claim 5, wherein the controller is operable to recognize that the first signal processor is transmitting the traffic signal in the first signal format on receipt of a control signal.

7. A method for operating a transmission system, comprising:
providing a first signal processor, a second signal processor and a transmission facility linking the first signal processor to the second signal processor, the first signal processor being operable to convert a traffic signal from a first signal format to a second signal format for transmission on the transmission facility to the second signal processor, and the second signal processor being operable to reconvert the traffic signal from the second signal format to the first signal format;
transmitting a control signal from the first signal processor to the second signal processor;
in response to receipt of the control signal transmitted by the first signal processor at the second signal processor, transmitting a control signal from the second signal processor to the first signal processor; and
in response to receipt of the control signal transmitted by the second signal processor at the first signal processor, the first signal processor transmitting the traffic signal to the second signal processor in the first signal format.

8. A method as defined in claim 7, further comprising:
recognizing at the second signal processor that the first signal processor is transmitting the traffic signal in the first signal format; and
in response to recognition at the second signal processor that the first signal processor is transmitting the traffic signal in the first signal format, passing the traffic signal in the first signal format at the second signal processor.

9. A method as defined in claim 8, further comprising transmitting a control signal from the first signal processor to the second signal processor when the first signal processor begins transmitting the traffic signal in the first signal format, wherein the step of recognizing at the second signal processor that the first signal processor is transmitting the traffic signal in the first signal format comprises recognizing said control signal at said second signal processor.

10. A method for operating a signal processor, comprising:
providing a signal format converter for converting a traffic signal from a first signal format to a second signal format, a message transmitter for transmitting control signals, a message receiver for receiving control signals, and a controller for controlling the signal format converter and the message transmitter;
when the signal format converter is enabled to convert the traffic signal from the first signal format to the second signal format, transmitting a control signal via the message transmitter; and
in response to receipt of a control signal by the message receiver, enabling the signal format converter to pass the traffic signal in the first signal format.

11. A method of operating a signal processor comprising:
converting a received signal from a second signal format to a first signal format;
transmitting a control signal on receipt of a control signal;
recognizing that the traffic signal is being received in the first signal format; and
in response to recognition that the traffic signal is being received in the first signal format, passing the traffic signal in the first signal format.

12. A method of operating a signal processor as defined in claim 11, wherein the step of recognizing that the traffic signal is being received in the first signal format comprises receiving and recognizing a control signal.

13. A transmission system, comprising a first signal processor, a second signal processor and a transmission facility linking the first signal processor to the second signal processor;
the first signal processor being operable to convert a traffic signal from a first signal format to a second signal format for transmission on the transmission facility to the second signal processor;
the second signal processor being operable to reconvert the traffic signal from the second signal format to the first signal format;
the first signal processor further being operable to transmit a first control signal to the second signal processor;
the second signal processor being responsive to the first control signal to send a second control signal to the first signal processor;
characterized in that:
the first signal processor is responsive to the second control signal to interrupt conversion of the traffic signal from the first signal format to the second signal format so that the traffic signal is transmitted from the first signal processor to the second signal processor in the first signal format and to transmit a third control signal to the second signal processor; and
the second signal processor is responsive to the third control signal to interrupt reconversion of the traffic signal from second signal format to the first signal format.

14. A transmission system as defined in claim 13, wherein:
the transmission facility supports bi-directional transmission between the first signal processor and the second signal processor;

the second signal processor is operable to convert another traffic signal from the first signal format for transmission on the transmission facility to the first signal processor;

the first signal processor is operable to reconvert the other transmitted traffic signal from the second signal format to the first signal format;

the second signal processor is operable to transmit the first control signal to the first signal processor;

the first signal processor is responsive to the first control signal to send the second control signal to the second signal processor;

the second signal processor is responsive to the second control signal to interrupt conversion of the other traffic signal from the first signal format to the second signal format so that the traffic signal is transmitted from the second signal processor to the first signal processor in the first signal format and to transmit the third control signal to the first signal processor; and the first signal processor is responsive to the third control signal to interrupt reconversion of the other traffic signal from the second signal format to the first signal format.

15. A transmission system as defined in claim 13, wherein the first, second and third control signals are in-band signals transmitted via the transmission facility.

16. A signal processor comprising:

a signal format converter for converting a traffic signal from a first signal format to a second signal format;

a message transmitter for transmitting control signals;

a message receiver for receiving control signals; and a controller for controlling the signal format converter and the message transmitter;

characterized in that the controller operates the message transmitter to transmit a first control signal when the signal format converter is enabled to convert the traffic signal from the first signal format to the second signal format and, in response to receipt of a second control signal by the message receiver, to disable the signal format converter and to operate the message transmitter to transmit a third control signal.

17. A signal processor as defined in claim 16 having:

a first state in which it transmits the first control signal and converts the traffic signal from the first signal format to the second signal format;

a second state in which it transmits the second control signal and converts the traffic signal from the first signal format to the second signal format; and a third state in which it transmits the third control signal and does not convert the traffic signal from the first signal format to the second signal format;

the signal processor being:

responsive to receipt of the first control signal to change from the first state to the second state; and responsive to receipt of the second control signal to change from the second state to the third state.

18. A signal processor as defined in claim 17, being responsive, when in the first state, to receipt of the second control signal to change from the first state to the second state.

19. A signal processor as defined in claim 18, wherein:

the signal format converter is also operable to convert another traffic signal from the second signal format to the first signal format in the first state, the second state and the third state of the signal processor;

the signal processor has a fourth state in which it transmits the third control signal, does not convert the traffic signal from the first signal format to the second signal format, and does not convert the other traffic signal from the second signal format to the first signal format; and the signal processor is responsive, when in the third state, to receipt of the third control signal to change from the third state to the fourth state.

20. A signal processor as defined in claim 19, being responsive, when in the second state, to receipt of the third control signal to change from the second state to the fourth state.

21. A signal processor as defined in claim 17, being responsive, when in the third state, to receipt of the first control signal to change from the third state to the first state.

22. A signal processor as defined in claim 19, being responsive, when in the fourth state, to receipt of one of the first control signal and the second control signal to change from the fourth state to the first state.

23. A signal processor as defined in claim 17, being responsive to receipt of no control signal to revert to the first state.

24. A method for operating a transmission system, the transmission system comprising a first signal processor, a second signal processor and a transmission facility linking the first signal processor to the second signal processor, the first signal processor being operable to convert a traffic signal from a first signal format to a second signal format for transmission on the transmission facility to the second signal processor and the second signal processor being operable to reconvert the traffic signal from the second signal format to the first signal format, the method comprising:

transmitting a first control signal from the first signal processor to the second signal processor;

in response to receipt of the first control signal by the second signal processor, transmitting a second control signal from the second signal processor to the first signal processor;

characterized in that.

in response to receipt of the second control signal by the first signal processor, the first signal processor interrupts conversion of the traffic signal from the first signal format to the second signal format so that the traffic signal is transmitted from the first signal processor to the second signal processor in the first signal format and transmits a third control signal to the second signal processor; and in response to receipt of the third control signal by the second signal processor, the second signal processor is interrupts reconversion of the traffic signal from second signal format to the first signal format.

25. A method as defined in claim 24, wherein:

the transmission facility supports bi-directional transmission between the first signal processor and the second signal processor, the second signal processor is operable to convert another traffic signal from the first signal format for transmission on the transmission facility to the first signal processor, and the first signal processor is operable to reconvert the other transmitted traffic signal from the second signal format to the first signal format;

the second signal processor transmits the first control signal to the first signal processor;

in response to receipt of the first control signal by the first signal processor, the first signal processor sends the second control signal to the second signal processor;

in response to receipt of the second control signal by the second signal processor, the second signal processor interrupts conversion of the other traffic signal from the first signal format to the second signal format so that the traffic signal is transmitted from the second signal processor to the first signal processor in the first signal format and the second signal processor transmits the third control signal to the first signal processor; and in response to receipt of the third control signal by the first signal processor, the first signal processor interrupts reconversion of the other traffic signal from the second signal format to the first signal format.

26. A method as defined in claim 24, wherein the first, second and third control signals are in-band signals transmitted via the transmission facility.

27. A method for operating a signal processor, comprising a signal format converter for converting a traffic signal from a first signal format to a second signal format, a message transmitter for transmitting control signals, a message receiver for receiving control signals, and a controller for controlling the signal format converter and the message transmitter, the method characterized in that the controller operates the message transmitter to transmit a first control signal when the signal format converter is enabled to convert the traffic signal from the first signal format to the second signal format and, in response to receipt of a second control signal by the message receiver, to disable the signal format converter and to operate the message transmitter to transmit a third control signal.

28. A method as defined in claim 27, wherein the signal processor has a first state in which it transmits the first control signal and converts the traffic signal from the first signal format to the second signal format, a second state in which it transmits the second control signal and converts the traffic signal from the first signal format to the second signal format, and a third state in which it transmits the third control signal and does not convert the traffic signal from the first signal format to the second signal format, comprising:

changing the signal processor from the first state to the second state in response to receipt of the first control signal; and changing the signal processor from the second state to the third state in response to receipt of the second control signal.

29. A method as defined in claim 28, comprising changing the signal processor from the first state to the second state in response to receipt of the second control signal when in the first state.

30. A method as defined in claim 29, wherein the signal format converter is also operable to convert another traffic signal from the second signal format to the first signal format in the first state, the second state and the third state of the signal processor and the signal processor has a fourth state in which it transmits the third control signal, does not convert the traffic signal from the first signal format to the second signal format, and does not convert the other traffic signal from the second signal format to the first signal format, comprising:

changing the signal processor from the third state to the fourth state in response to receipt of the third control signal when in the third state.

31. A method as defined in claim 30, comprising changing the signal processor from the second state to the fourth state in response to receipt of the third control signal when in the second state.

32. A method as defined in claim 28, comprising changing the signal processor from the third state to the first state in response to receipt of the first control signal when in the third state.

33. A method as defined in claim 30, comprising changing the signal processor from the fourth state to the first state in response to receiving one of the first control signal and the second control signal when in the fourth state.

34. A method as defined in claim 28, comprising reverting to the first state in response to receiving no control signal.

* * * * *

UNITED STATES PATENT AND TRADEMARK OFFICE
CERTIFICATE OF CORRECTION

PATENT NO. : 6,185,424 B1  Page 1 of 1
APPLICATION NO. : 09/096192
DATED : February 6, 2001
INVENTOR(S) : Hermon Pon et al.

It is certified that error appears in the above-identified patent and that said Letters Patent is hereby corrected as shown below:

Title Page, item [60] insert the following:

--This application is a continuation of U.S. Patent Application No. 08/358,949, filed December 19, 1994, now issued as U.S. Patent No. 5,768,308.--

Signed and Sealed this

First Day of January, 2013

David J. Kappos
*Director of the United States Patent and Trademark Office*